UNITED STATES PATENT OFFICE.

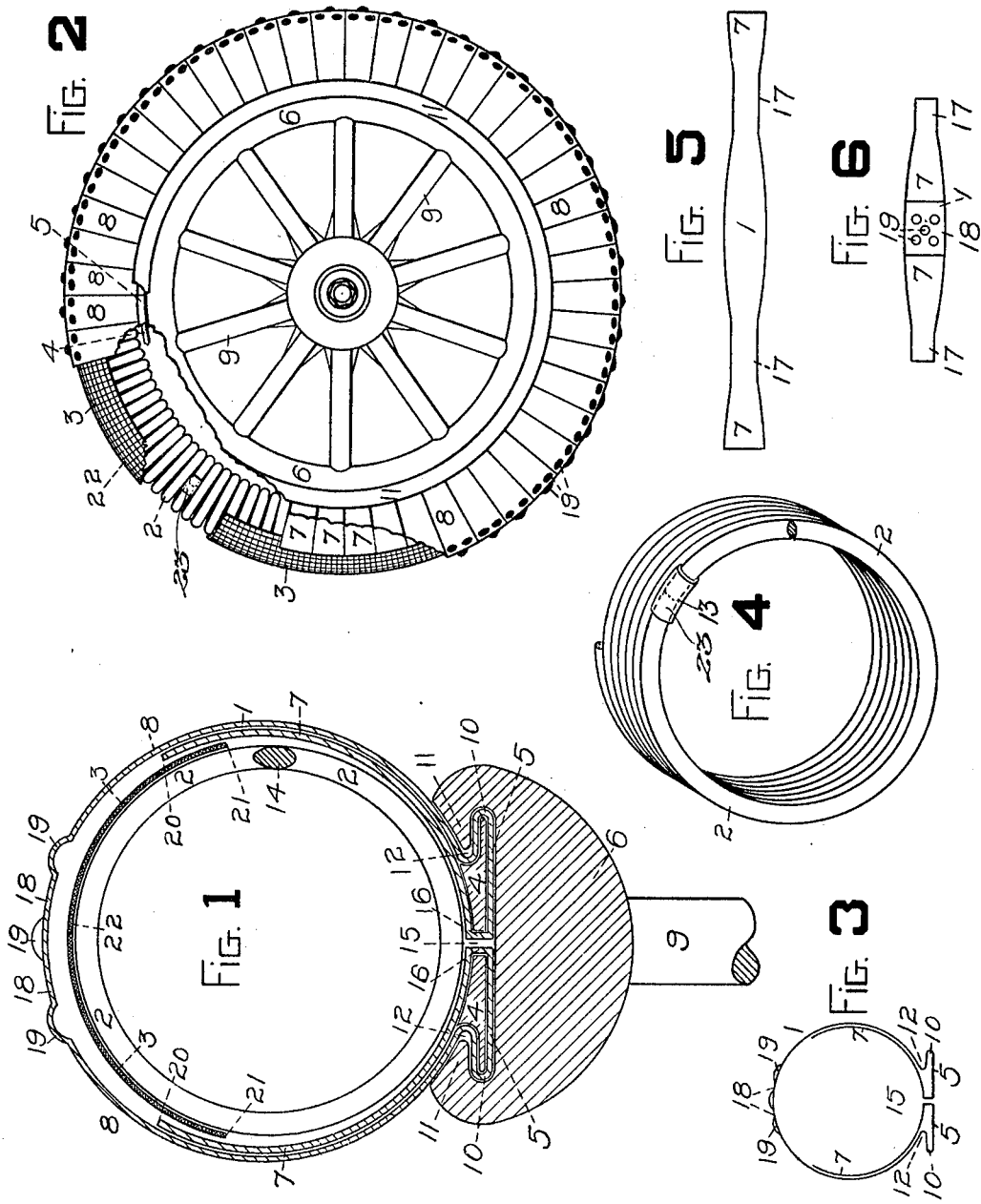

FRANK W. WIEBER, OF COLORADO SPRINGS, COLORADO; CHARLES J. WIEBER EXECUTOR OF SAID FRANK W. WIEBER, DECEASED.

RESILIENT METAL TIRE FOR VEHICLE-WHEELS.

1,034,942.     Specification of Letters Patent.     Patented Aug. 6, 1912.

Application filed April 17, 1911. Serial No. 621,680.

*To all whom it may concern:*

Be it known that I, FRANK W. WIEBER, a citizen of the United States, residing at Room 30, Midland Block, in the city of Colorado Springs, in the county of El Paso and State of Colorado, have invented a new and useful Resilient Metal Tire for Vehicle-Wheels, of which the following is a specification.

My invention relates to improvements in resilient metal tires for vehicle wheels in which a spring coil surrounds the periphery of a wheel and acts as the pressure supporting medium and is inclosed in a sectional metal casing provided with appropriate fastenings to secure it to the periphery of the wheel and with a separating fiber or leather band between the outer periphery of the said coil and the inner surface of the said outer casing; and the objects of my improvement are, first, to provide a resilient tire; second, to provide a puncture proof tire; third, to provide a lighter tire than the usual ones now in use; fourth, to provide a less expensive tire than the ones now in use; fifth, to produce a more durable tire than the ones now in use. I attain these objects by means of the construction and appliance illustrated in the accompanying drawing, in which—

Figure 1, is a transverse section of the tire and a part of a vehicle wheel; Fig. 2, a side elevation of an automobile wheel provided with the resilient metal tire; Fig. 3, is a diagrammatic cross sectional view of the outer plate 1, formed as shown in Fig. 1; Fig. 4, is a perspective of a part of the supporting spring coil 2; Fig. 5, is a diagrammatic plan of the outer plate 1, before being bent into form; Fig. 6, is a diagrammatic plan of the outer plate 1, folded upon itself at each end before being bent into the shape shown in Fig. 3.

Similar figures refer to similar parts throughout the several views.

In Figs. 1, 2 and 4, is shown the supporting spring coil 2. This coil receives and supports the weight of the load of the wheel. This coil takes the place of the confined and compressed air in a pneumatic tire, and tends to maintain the shape of the outer plates 1, as shown in Fig. 1. This coil is made of spring wire, and extends around the entire periphery of the wheel and within the casing formed of the outer plates 1, and the fabric tread piece 3. The ends of the wire are inserted into a thimble cup 23 and brazed together as required. The weight usually rests upon many of the rings of the coil at one time and the normal depression under a normal load is supposed to be about one fifteenth of the diameter of the coil. It is however provided that the depression may extend to about one third of the diameter of the coil without making a permanent flexure.

The outer plate 1, is formed as shown in Fig. 3, into a casing section and as shown in Figs. 1 and 2, having the circular outer part 8, forming the outer shell of the tire and having the hollow base 5, resting against the periphery of the rim 6. This hollow base 5, has a stiffening filling 4, to prevent the crushing of the base 5 by the pressure between the rim 6, and the coil 2. This base 5, is provided with an outwardly projecting loop 10, provided to engage the inwardly projecting flange 11, on the rim 6, to hold the tire in place. The extreme end 7, of the outer plate 1, as shown in Fig. 5, is bent upon itself as shown in Fig. 6, forming two thicknesses of this plate as shown in Figs. 1 and 3.

At 17, in Figs. 5 and 6, is shown the narrow part of the outer plate 1, where it rests against the rim 6, of the wheel and therefore is narrower than the other parts of the same, which extend outwardly from the wheel where the lines tend to radiate to broader surface.

This tire is intended to be used on any clencher rim although there is no removable clencher shown here.

There is a space left between the ends 16, of the base 5, at 15, provided to allow the removal of the outer plates 1. The stiffening filling piece 4, is inserted tightly into the fold of the hollow base 5, to prevent it from crushing with the pressure between the coil 2, and the rim 6. The circular outer part 8, of the outer plate 1, forms the casing of the tire and the tread 18, of the tire. This outer plate 1, keeps the tire on the wheel by being held by the outward projecting loops 10. The tread part 18, of the outer plate 1, is provided with projections 19, adapted to prevent the tire from slipping on the road way.

In Fig. 4 is shown the rectangular cut end of the spring coil 2, at 13, provided to be united with a thimble and brazed or soldered, while in Fig. 1 the end 14, of the spring coil 2 is shown cut off diagonally so as to form a more cohesive union as by brazing or fusing or welding. The end 20, of the inner tongue 7, extends past the edge 21, of the fabric tread piece 3, as shown in Fig. 1. This tread piece tends to hold the parts in place and to evenly distribute the pressure against the circular outer parts 8, upon the spring coil 2, and deadens the sound of metal against metal that would otherwise likely occur between the outer part 8 and the coil 2. The inner tongue 7 also tends to stiffen the walls of the casing and resists the tendency of the coil 2 from rolling off the flange 11, of the rim 6. The recesses 12, 12, are provided to receive the flanges 11, 11, when the hollow bases 5, 5, are forced outwardly and against the rim 6, by the pressure of the supporting spring 2, and at the same time the outwardly projecting loops 10, 10 of the bases 5, 5, are forced apart and under the inwardly projecting flanges 11, 11.

The spokes 9, are of a common wheel and are no part of my invention.

I am aware that prior to my invention metallic spring tires have been invented for vehicle wheels. I therefore do not claim such a combination broadly; but

I claim—

In a spring metallic tire for the wheels of vehicles, the combination of a resilient spring coil consisting of a wound spiral wire formed into an endless coil, a thin metal casing formed of separate sections inclosing said coil, the sections of said casing being secured to the rim of the wheel by means of clenches hooked into the clencher flanges on the wheel, said sections having their free ends bent upon themselves and extending within said casing to near the tread face of said casing, the bent part of said ends where the casing is in contact with the wheel being bent to form a hollow, a filling of wood or fiber within said hollow of said casing, provided to stiffen it to support the pressure between the said coil and the rim of the wheel, an endless belt of fiber between the tread of said casing and the tread of said coil, all substantially as set forth and for the purposes specified.

FRANK W. WIEBER. [L. s.]

Witnesses:
 Effie Cook,
 H. K. Wing.

---

Copies of this patent may be obtained for five cents each, by addressing the "Commissioner of Patents, Washington, D. C."